United States Patent [19]

Ritzinger

[11] Patent Number: 4,771,200
[45] Date of Patent: Sep. 13, 1988

[54] SYNCHRO GENERATOR ASYMMETRIC MAGNETICALLY CONDUCTIVE ROTOR

[75] Inventor: Georg Ritzinger, Klosterneuburg, Austria

[73] Assignee: Voest-Alpine Automotive Gesellschaft, Linz, Austria

[21] Appl. No.: 54,413

[22] Filed: May 26, 1987

[30] Foreign Application Priority Data

May 30, 1986 [DE] Fed. Rep. of Germany ....... 3618175

[51] Int. Cl.$^4$ .................... H02K 19/12; H02K 19/24; H02K 24/00
[52] U.S. Cl. .................................. 310/162; 310/208; 310/261; 318/661
[58] Field of Search ............... 310/166, 168, 171, 208, 310/254, 265, 162, 163; 318/340, 347, 652, 653, 654, 661; 336/79, 135, 188, 225

[56] References Cited

U.S. PATENT DOCUMENTS

| | | |
|---|---|---|
| 2,704,353 | 3/1955 | Alkan .................................. 336/135 |
| 2,866,913 | 12/1958 | Kronacher . |
| 3,736,449 | 5/1973 | Honeywell et al. ................. 310/171 |
| 4,479,068 | 10/1984 | Idogaki et al. ...................... 310/162 |
| 4,527,120 | 7/1985 | Kurosawa ........................... 318/661 |
| 4,551,699 | 11/1985 | De Jong et al. .................... 336/135 |
| 4,705,975 | 11/1987 | Ritzinger ............................. 310/162 |

FOREIGN PATENT DOCUMENTS

| | | |
|---|---|---|
| 0214114 | 10/1986 | European Pat. Off. . |
| 2261236 | 6/1973 | Fed. Rep. of Germany . |
| 2931724 | 2/1980 | Fed. Rep. of Germany . |
| 3432395 | 3/1986 | Fed. Rep. of Germany . |
| 453315 | 6/1913 | France . |
| 1111737 | 11/1955 | France ............................... 310/261 |
| 1531875 | 5/1968 | France . |

*Primary Examiner*—Patrick R. Salce
*Assistant Examiner*—D. L. Rebsch
*Attorney, Agent, or Firm*—McAulay, Fields, Fisher, Goldstein & Nissen

[57] ABSTRACT

A synchro generator comprising a stator having a signal coil with at least two signal windings offset at predetermined angles relative to each other, and an exciter coil having an exciter winding concentric with the signal coil. A core of magnetically conductive material is allocated to at least one of the coils, and comprises a rotor of magnetically conductive material asymmetric relative to its axis of rotation. The signal coil is a cylindrical coil with obliquely wound windings, and the exciter coil is a cylindrical coil with a straight (spool) wound winding. A substantially cylindrical shell of magnetically conductive material is allocated to the coils and the rotor comprises at least a pair of diametrically opposed conducting members of magnetically conductive material.

20 Claims, 2 Drawing Sheets

SYNCHRO GENERATOR ASYMMETRIC MAGNETICALLY CONDUCTIVE ROTOR

BACKGROUND OF THE INVENTION

The invention relates to a synchro generator.

More particularly the invention is concerned with a synchro generator including a stator, which comprises a signal coil having at least two signal windings which are offset at predetermined angles relative to each other, as well as an exciter coil having an exciter winding which is concentric with the signal coil, a core of magnetically conductive material being allocated to at least one of the coils, and comprising a rotor of magnetically conductive material asymmetric relative to its axis of rotation.

SUMMARY OF THE INVENTION

In a synchro generator of that type disclosed by U.S. Pat. No. 2,704,353 the stator consists of a toroidal outer winding wound around an annular core and having three taps to form a three-phase system. An exciter coil being an air-core coil and having a straight cylindrical winding is provided inside said signal coil concentric therewith. Inside this coil arrangement, an inclined disc of soft iron is pivoted to the shaft of a magnetic compass.

In the absence of the soft iron disc, theoretically no voltage from the a.c. fed exciter coil would be induced in the signal coil, because its windings and lines of flux are orthogonally disposed. Depending on the position of the inclined disc, however, a mutual inductance coefficient other than zero will be present locally, so that at the outputs of the three-phase system, three alternating voltages occur, which in this case are supplied to a synchro indicator.

The respective rotation angle of the rotor may, however, also be calculated from the output voltages, as is disclosed, e.g., by the Published German Patent Application No. 34 32 395, for a synchro generator comprising a rotor carrying the exciter coil.

OBJECTS AND MAIN FEATURES OF THE INVENTION

Compared with other known solutions which—as mentioned above, comprise a rotor having an exciter winding, the known synchro generator has the advantage of comprising a rotor having a simple and light construction and low inertia, but the use of an annular core with toroidal winding results in high production costs. Furthermore, the local coupling between the two coils is only very weak, so that a comparatively high exciting power is required to generate sufficiently large output signals.

The object of the invention is to provide a synchro generator whose construction, on the one hand, permits simple and inexpensive production and, on the other hand, ensures the precision required to achieve a high resolution and reproducibility.

This object can be accomplished with a synchro generator of the kind described above, in which according to the invention the signal coil is a cylindrical coil having obliquely wound windings and the exciter coil is a cylindrical coil with a straight wound winding; a substantially cylindrical shell of magnetically conductive material is allocated to the coils and the rotor comprises at least a pair of diametrically opposed conducting members of magnetically conductive material.

In the synchro generator designed according to the invention it is possible to use commercial coils having obliquely wound windings. Such coils have been disclosed for use in direct current machines, e.g. in Published German Patent Application No. 22 61 236 or Published German Patent Application No. 29 31 724. Such coils can be fully automatically made on winding machines with high accuracy and at low cost. Because of the use of a rotor without a coil, the problems connected with feeding the rotor winding are not encountered, and also the cylindrical exciter coil may be automatically wound. The shell of magnetically conductive material effects a good concentration of flux lines which requires only low exciting power.

A useful further embodiment of the subject of the invention is characterized in that the conducting members of the rotor comprise at least two lobes of sheet metal bent along the surface of a cylinder, which results in an effective deflection of the field at low production costs.

If each lobe extends from one of the two axially offset sheet metal rings in the direction of the other ring, not only good mechanical stability, but also a particularly good guidance of the flux lines is achieved.

In this respect it is also advantageous if the lobes are integral with the sheet metal rings.

In practice, it has proved useful if the shell surrounds the coils on their outer surfaces and if the conducting members of the rotor rotate inside the coils.

Undesired stray fields reducing the efficiency may be kept very small if the shell comprises, at its two ends, pole rings concentrically surrounding the sheet metal rings of the rotor.

The use of an electrically conductive shell affords the additional advantage that axial alternating fields which may also be created, e.g. by a step motor that is connected to the synchro generator, will be greatly attenuated.

The zero signal induced in the obliquely wound windings may largely be compensated if the signal coil comprises 2n, preferably n=3, individual windings, a pair of opposing individual windings being connected in series in pole opposition to constitute a signal winding.

The invention and further advantages and features thereof will be explained in greater detail in the following by way of an example of an embodiment illustrated in the drawing.

DESCRIPTION OF THE PREFERRED EMBODIMENTS

Figure 1:
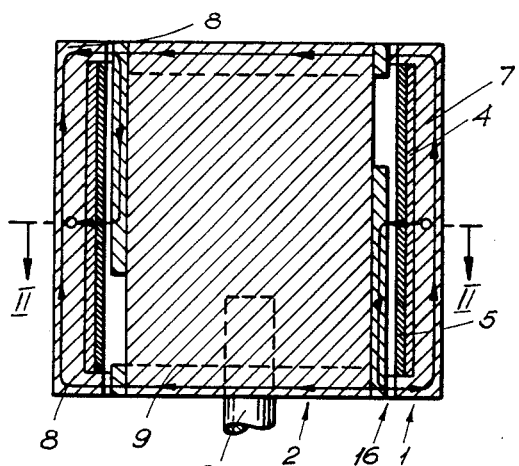
FIG. 1 is a section through the axis of a synchro generator according to the invention.

According to FIG. 1 the synchro generator according to the invention substantially comprises a stator 1 and a rotor 2, which is connected to a shaft 3, e.g., to the shaft of a step motor that is not shown and whose respective rotation angle is to be indicated. The rotor 2 may have a support of its own or be freely supported on the shaft 3 which is supported in another place outside the synchro generator.

Figure 4:
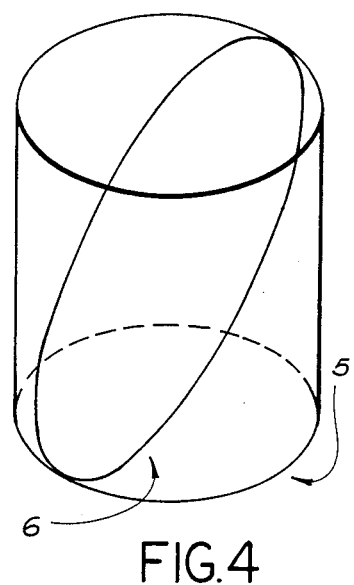
FIG. 4 is a diagrammatic view of the signal coil with one turn of a signal winding.
Figure 5:
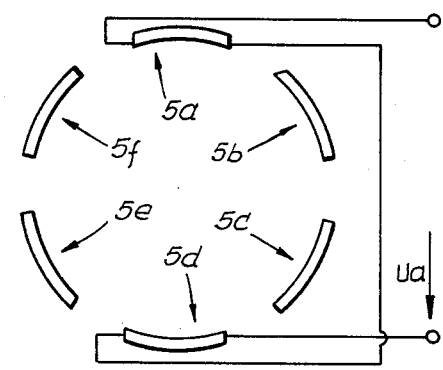
FIG. 5 shows the interconnection of individual windings of the signal coil.

The stator 1 comprises two concentric cylindrical coils, namely, an outer exciter coil 4 having a straight (spool) wound winding and an inner signal coil 5 having obliquely wound windings. In the present embodiment six obliquely wound windings 5a, b, c, d, e, f, each offset 60°, are provided which are diagrammatically represented in FIG. 5. FIG. 4 shows a single turn 6 of one of the individual windings 5a to f. Each of the individual windings extends, as seen in FIG. 5 in a cross section of the signal coil 5, around 60°; however, it must be borne in mind that the windings are obliquely wound so that, in fact, each turn of each individual winding 5a to f extends around 360° in a top plan view taken in the direction of the axis of the coil.

Figure 6:
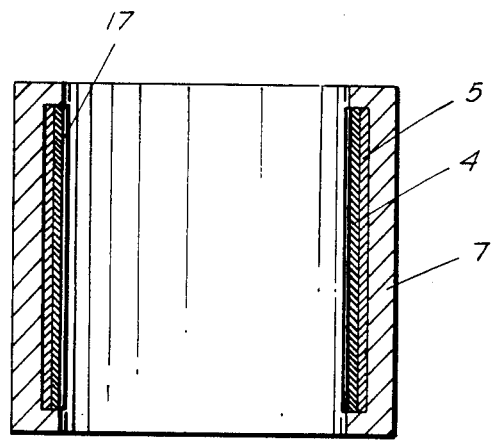
FIG. 6 is a showing of the specific embodiment showing the exciter coil outside of the signal coil.

Even if, in the present case, the signal coil 5 is arranged inside the exciter coil 4, both coils may just as well be exchanged so that the exciter coil 4 is positioned inside as shown in FIG. 6, see exciter coil 4a.

Figure 7:
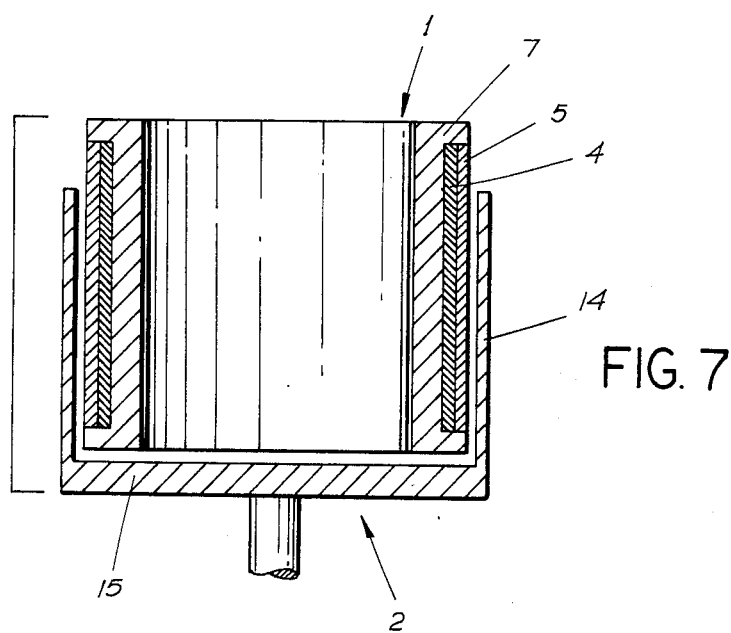
FIG. 7 is a drawing showing the FIG. 6 arrangement with the rotor on the outside of the stator.

When positioning exciter coil 4a inside signal coil 5a, as shown in FIGS. 6 and 7, it is also desirable to position conductive shell 7a inside exciter coil 4a. Signal coil 5a is also obliquely wound in the same manner as coil 5. In FIG. 7, the parts corresponding to the same or equivalent parts in FIGS. 1 to 5 have been designated with the letter "a" for simplicity. Air gap 16a is defined by rotor 2a rotating outside of stator 2a.

Both coils 4, 5 are surrounded on their outer surface by a cylindrical shell 7. The shell is provided with pole rings 8 at both of its ends. As shown, both coils 4, 5 are disposed on the inside surface of the shell 7 between the pole rings 8 such that the inside surface of the signal coil 5 is in alignment with the inside surfaces of the pole rings 8 and a continuous cylindrical inside surface of the stator 1 is obtained. The shell 7 may be of ferrite, dynamo sheet or the like.

Figure 3:
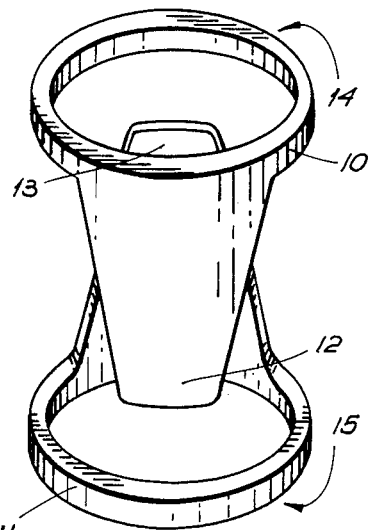
FIG. 3 is a diagrammatic view of the conducting members of the rotor.
Figure 2:
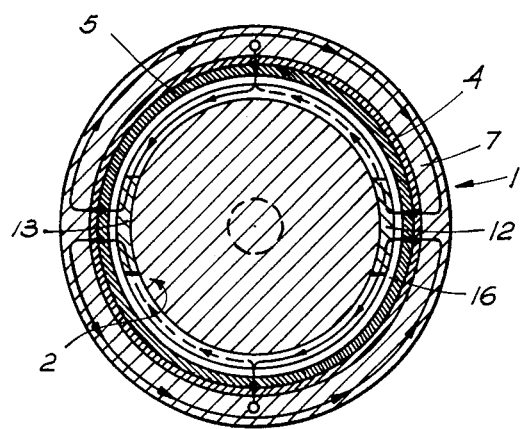
FIG. 2 is a sectional view along the line II—II of FIG. 1.

The rotor 2 comprises a carrier 9 of non-ferromagnetic material, e.g. plastic, which is positioned on the shaft 3. Two sheet strips of the type illustrated in FIG. 3 are secured to, e.g. glued on, the carrier 9, said sheet strips comprising two axially offset sheet metal rings 10, 11 from which two lobes 12, 13 which are integral with the rings 10, 11 and which are bent along the surface of a cylinder extend, offset 180° relative to each other, each in the direction of the other ring. The rings 10, 11 together with the corresponding lobes 12, 13 constitute conducting members 14, 15 for the magnetic field, and they are made of magnetically conductive material, e.g. soft iron sheet. The rotor 2 may rotate inside the stator 1, defining an air gap 16.

In operation the exciter coil 4 is connected to a low-frequency a.c. voltage, generating a substantially axial alternating flux. In the absence of the conducting members an a.c. voltage of the same magnitude and of the same phase would be induced in each of the obliquely wound individual windings so that the voltage would be zero at the output terminals of two windings connected in series in phase opposition (e.g. 5a, 5d in FIG. 5). By the conducting members 14, 15 however, the alternating magnetic flux is deflected in the radial direction in two diametrically opposed places (cf. FIGS. 1 and 2) thus inducing a.c. voltages of opposite phases in opposing partial windings, e.g. the windings 5a and 5d, which—due to the connection of these windings in phase opposition—are twice as high at the output terminals. In FIG. 5 the terminal voltage of the windings $5a+5d$ is referred to as $u_a$. Analogously, $u_b$ is the output voltage for the windings $5b+5e$ and $u_c$ is the output voltage for the windings $5c+5f$, not shown.

Thus there are three output voltages $$u_a = u_0 \cos(\omega t + \phi) \sum_{n=1}^{k} \sin\left(\alpha + \frac{2\pi}{3} \cdot \frac{n-1}{k}\right)$$

$$u_b = u_0 \cos(\omega t + \phi) \sum_{n=1}^{k} \sin\left(\alpha + \frac{2\pi}{3} \cdot \frac{n-1}{k} + \frac{2\pi}{3}\right)$$

$$u_c = u_0 \cos(\omega t + \phi) \sum_{n=1}^{k} \sin\left(\alpha + \frac{2\pi}{3} \cdot \frac{n-1}{k} + \frac{4\pi}{3}\right)$$

wherein $u_0$ ... maximum value of the induced signal
$\alpha$ ... rotation angle of the rotor
$\phi$ ... rotor-stator phase displacement
$\omega$ ... angular frequency of the excitation voltage
$k$ ... number of turns per winding
$n$ ... summation index It is apparent that the angle $\alpha$ can be calculated from two of the three signal voltages $u_a$, $u_b$, $u_c$. It will be desirable, however, to have all three signal voltages available because in that case, e.g. the division by values close to zero can be avoided.

The angle $\alpha$ can be calculated by analog or digital methods in known circuits and is not subject matter of the present invention.

In any case, it will be sufficient to provide only two signal windings or pairs of signal windings, which will be offset 90° from each other in that case.

In order to suppress axial alternating fields which may be created, e.g. by a step motor mounted on the shaft 3, the magnetically conductive shell 7 may be made of a material which is also electrically conductive. Since the air gap 16 between the rotor 2 and the inside surface of the coil 5 should be small, it may be advisable to provide the inside surface of the signal coil 5 with a hard protective layer 17, as shown in FIG. 6 (not shown in FIG. 1) so as to avoid damage to the winding in the event that the conducting members 14, 15 rub on the coil 5.

Because obliquely wound coils may be made with high accuracy, the position-dependent function of the signal voltage will actually consist of a sine function, so that the position angle $\alpha$ can be calculated by means of simple algorithms without special corrections. Besides, a cylindrical coil with obliquely wound winding can be made fully automatically and therefore at low cost with high linearity and reproducibility.

It has already been mentioned that the positions of the exciter coil 4 and of the signal coil 5 may be exchanged. It is, moreover, possible to position the shell of conductive material on the inside surface of the coils, conducting members of the rotor then surrounding the coils from outside. The conducting members may also have a different shape, e.g. extend rod-shaped along a cylinder generatrix, and it is also conceivable to use only a single conducting member instead of a pair of conducting members, but this will result in a reduced efficiency.

I claim:

1. A synchro generator, comprising:
   a stator including a signal coil having a least two signal windings offset at predetermined angles relative to each other and an exciter coil having an exciter winding concentric with said signal coil;
   a core of magnetically conductive material allocated to at least one of said coils, said core including a rotor of magnetically conductive material asymmetric to its axis of rotation;
   said signal coil (5) being a cylindrical coil with obliquely wound windings and said exciter coil (4) being a cylindrical coil with a straight wound winding;
   a substantially cylindrical shell (7) of magnetically conductive material allocated to said coils (4, 5); and
   said rotor (2) including at least one pair of diametrically opposed conducting members (14, 15) of magnetically conductive material.

2. The synchro generator according to claim 1, wherein said conducting members (14, 15) comprise at least two lobes (12, 13) of sheet metal bent along the surface of a cylinder.

3. The synchro generator according to claim 1, wherein each said conducting member includes an axially offset sheet metal ring (10, 11, respectively).

4. The synchro generator according to claim 3, wherein each said lobe (12 and 13, respectively) extends from one of said two axially offset sheet metal rings (10, 11) in the direction of the other ring.

5. The synchro generator according to claim 2, wherein said lobes (12, 13) are integral with said sheet metal rings (10, 11).

6. The synchro generator according to claim 4, wherein said lobes (12, 13) are integral with said sheet metal rings (10, 11).

7. The synchro generator according to claim 6, wherein said shell (7) surrounds said coils (4, 5) on their outer surfaces and said conducting members (14, 15) rotate inside said coils.

8. The synchro generator according to claim 1, wherein said shell (7) surrounds said coils (4, 5) on their outer surfaces and said conducting members (14, 15) rotate inside said coils.

9. The synchro generator according to claim 7, wherein said shell (7) comprises at its two end pole rings (8) concentrically surrounding said sheet metal rings (10, 11).

10. The synchro generator according to claim 8, wherein said shell (7) comprises at its two ends pole rings (8) concentrically surrounding said sheet metal rings (10, 11).

11. The synchro generator according to claim 1, wherein said shell (7) comprises, at its two ends, pole rings (8) concentrically surrounding said sheet metal rings (10, 11).

12. The synchro generator according to claim 1, wherein said shell (7) is electrically conductive.

13. The synchro generator according to claim 10, wherein said shell (7) is electrically conductive.

14. The synchro generator according to claim 11, wherein said shell (7) is electrically conductive.

15. The synchro generator according to claim 1, wherein said signal coil comprises 2n individual windings, and a pair of opposing individual windings (5a, 5d) being connected in series in pole opposition to constitute a signal winding.

16. The synchro generator according to claim 1, wherein said signal coil includes six individual windings, and said signal winding is formed from a pair of opposing individual windings (e.g., 5a, 5d) connected in series in pole opposition.

17. The synchro generator according to claim 1, wherein there are at least two pairs of said signal windings offset 90° from each other.

18. The synchro generator according to claim 1, wherein each turn of each individual winding extends around 360° in a top plan view taken in the direction of the axis of the coil.

19. The synchro generator according to claim 1, wherein the signal coil (5) is arranged outside the exciter coil (4).

20. The synchro generator according to claim 9, wherein said signal coil comprises 2n individual windings, and a pair of opposing individual windings (5a, 5d) connected in series in pole opposition to constitute a signal winding.

* * * * *